(12) United States Patent
Chen

(10) Patent No.: US 10,880,766 B2
(45) Date of Patent: Dec. 29, 2020

(54) METHOD AND APPARATUS FOR DETECTING CHARACTERISTIC SEQUENCE IN WIRELESS COMMUNICATION SYSTEM

(71) Applicant: DATANG MOBILE COMMUNICATIONS EQUIPMENT CO., LTD., Beijing (CN)

(72) Inventor: Xianguo Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 27 days.

(21) Appl. No.: 16/471,991

(22) PCT Filed: Dec. 13, 2017

(86) PCT No.: PCT/CN2017/115949
§ 371 (c)(1),
(2) Date: Jun. 20, 2019

(87) PCT Pub. No.: WO2018/113569
PCT Pub. Date: Jun. 28, 2018

(65) Prior Publication Data
US 2019/0335514 A1 Oct. 31, 2019

(30) Foreign Application Priority Data
Dec. 21, 2016 (CN) .......................... 2016 1 1191044

(51) Int. Cl.
*H04W 24/08* (2009.01)
*H04W 24/00* (2009.01)

(52) U.S. Cl.
CPC ........... *H04W 24/08* (2013.01); *H04W 24/00* (2013.01)

(58) Field of Classification Search
CPC .............................. H04W 24/00; H04W 24/08
See application file for complete search history.

(56) References Cited

U.S. PATENT DOCUMENTS

2003/0223085 A1* 12/2003 Rekimoto .............. G01B 11/00
  356/614
2013/0100823 A1 4/2013 Ren et al.
(Continued)

FOREIGN PATENT DOCUMENTS

CN 101944929 A 1/2011
CN 102843328 A 12/2012
(Continued)

OTHER PUBLICATIONS

International Search Report (in English) dated Feb. 24, 2018, for corresponding PCT/CN2017/115949.
(Continued)

*Primary Examiner* — Kevin C. Harper
(74) *Attorney, Agent, or Firm* — Nath, Goldberg & Meyer; Joshua B. Goldberg

(57) ABSTRACT

Embodiments of the present disclosure provide a method and an apparatus for detecting a characteristic sequence in a wireless communication system. The method includes: receiving, by a receiving end base station, an original characteristic sequence periodically transmitted by a transmitting end base station; detecting out, by the receiving end base station, a candidate characteristic sequence meeting a preset condition from the original characteristic sequence; determining whether the candidate characteristic sequence is a valid characteristic sequence; and detecting whether there is an associated event based on a preset rule according to the detected valid characteristic sequence. In this way, it is solved the problem that it cannot be guaranteed that the number of characteristic sequences falsely detected is reduced without increasing the missed-detection probability in a scenario of larger number of detections in the prior art.

16 Claims, 4 Drawing Sheets

(56) References Cited

U.S. PATENT DOCUMENTS

| | | | |
|---|---|---|---|
| 2014/0086173 A1 | 3/2014 | Sadeghi et al. | |
| 2014/0177486 A1* | 6/2014 | Wang | H04L 5/0053 |
| | | | 370/280 |
| 2017/0149599 A1* | 5/2017 | Kang | H04B 1/69 |
| 2018/0248680 A1* | 8/2018 | Ji | H04L 27/2662 |

FOREIGN PATENT DOCUMENTS

| | | |
|---|---|---|
| CN | 102523185 B | 11/2014 |
| CN | 105530701 A | 4/2016 |
| EP | 2439973 A1 | 4/2012 |
| WO | 2008054322 A2 | 5/2008 |

OTHER PUBLICATIONS

First office action dated Mar. 19, 2020 for application No. CN201611191044.2.

Extended European search report was dated Jun. 16, 2020 for application No. EP 17 88 5314.9.

* cited by examiner

METHOD AND APPARATUS FOR DETECTING CHARACTERISTIC SEQUENCE IN WIRELESS COMMUNICATION SYSTEM

CROSS-REFERENCE TO RELATED APPLICATIONS

This is a National Phase Application filed under 35 U.S.C. 371 as a national stage of PCT/CN2017/115949, filed Dec. 13, 2017, an application claiming the benefit of Chinese Application No. 201611191044.2, titled "METHOD AND APPARATUS FOR DETECTING CHARACTERISTIC SEQUENCE IN WIRELESS COMMUNICATION SYSTEM" and filed to the State Intellectual Property Office of CHINA on Dec. 21, 2016, the entire contents of which are hereby incorporated herein by reference.

FIELD OF TECHNOLOGY

The present disclosure relates to the field of wireless communication technologies, and more particularly, to a method for detecting a characteristic sequence in a wireless communication system and an apparatus for detecting a characteristic sequence in a wireless communication system.

BACKGROUND

Nowadays, with the increasing popularity of mobile Internet applications and smart terminals, users have proposed increasing requirements for wireless communication efficiency. In a TD-LTE (Time Division Long Term Evolution) system, a characteristic sequence detection program is introduced in the industry to solve distant interference that widely exists in the existing networks.

In an LTE (Long Term Evolution) system, UE (user equipment) transmits a Zadoff-Chu preamble sequence on a PRACH (Physical Random Access Channel), and a base station detects out the preamble sequence via a correlation detection algorithm, and thus recognizes that the UE initiates a random access. In the TD-LTE system, the characteristic sequence detection program is introduced in the industry to solve the distant interference that widely exists in the existing networks. Its basic concept is as below: an interfered base station periodically transmits a characteristic sequence on special subframe DwPTS (Downlink Pilot Time Slot). The characteristic sequence adopts a gold sequence. A receiving base station detects out the characteristic sequence by using a correlation detection algorithm, and thus recognizes a distant interference source. After the distant interference is detected, the receiving end may perform adaptive interference avoidance processing.

To assess a characteristic sequence detection performance of the receiving end, two performance indexes are used in the industry, i.e., a false-detection probability and a missed-detection probability, which are respectively described as follows:

the false-detection probability: the probability of detecting out a specific sequence at the receiving end when the transmitting end does not transmit a sequence signal; and the missed-detection probability: a probability of not detecting out or falsely detecting a sequence at the receiving end when the transmitting end transmits a certain sequence.

For the characteristic sequence detection algorithm, a correlation detection algorithm is generally adopted in the prior art. That is, a correlation calculation is performed on the received sequence signal and the reference sequence. If a correlation peak exceeds a preset threshold, it is determined that a characteristic sequence is detected out. For the detection of a characteristic sequence in the distant interference scenario, to improve the detection reliability, it is determined that the distant interference is detected out if characteristic sequences are detected continuously within continuous time in the prior art. Specifically, it is determined that the distant interference is detected out if characteristic sequences are detected out for N times in P times of detection of the characteristic sequences (N<=P).

However, in the detection of characteristic sequences using the prior art, the following problems may frequently be encountered.

1. When the number of times of detection is large (for example, in some real-time detection scenarios), the number of the characteristic sequences detected falsely is large even though the false-detection probability is lower, which may overwhelm real characteristic sequences detected out, thus resulting in detection failure.

2. When the number of the characteristic sequences detected falsely is large, to avoid a false determination, the false-detection probability is required to be as low as possible. However, in the prior art, it is difficult to guarantee an extremely low false-detection probability without increasing the missed-detection probability. However, if the measure of increasing the detection threshold is adopted to lower the false-detection probability, the missed-detection probability may be increased, which may result in false determination of a target event.

For scenarios of larger number of times of detection, to avoid a false determination, the false-detection probability is required to be as low as possible. However, in the prior art, it is difficult to guarantee an extremely low false-detection probability without increasing the missed-detection probability. However, if the measure of increasing the detection threshold is adopted to lower the false-detection probability, the missed-detection probability may be increased. Therefore, in this scenario, it is difficult to simultaneously satisfy the requirements for the false-detection probability and the requirements for the missed-detection probability in the prior art.

SUMMARY

In view of the above problems, embodiments of the present disclosure are proposed to provide a method for detecting a characteristic sequence in a wireless communication system and an apparatus for detecting a characteristic sequence in a wireless communication system to overcome or at least partially solve the above problems.

To solve the above problems, an embodiment of the present disclosure discloses a method for detecting a characteristic sequence in a wireless communication system, which includes:

receiving, by a receiving end base station, an original characteristic sequence periodically transmitted by a transmitting end base station;

detecting out, by the receiving end base station, a candidate characteristic sequence meeting a preset condition from the original characteristic sequence;

determining whether the candidate characteristic sequence is a valid characteristic sequence; and detecting whether there is an associated event based on a preset rule according to the detected valid characteristic sequence.

The preset condition includes: a maximum value of a correlation value sequence corresponding to the original characteristic sequence being greater than a preset detection threshold.

Preferably, the step of detecting out, by the receiving end base station, a candidate characteristic sequence meeting a preset condition from the original characteristic sequence includes:

performing a correlation calculation on the original characteristic sequence and a preset local reference characteristic sequence by the receiving end base station to obtain the correlation value sequence;

extracting a maximum correlation value from the correlation value sequence; and determining that the candidate characteristic sequence meeting the preset condition is detected out when the maximum correlation value is greater than the preset detection threshold; otherwise, determining that the candidate characteristic sequence meeting the preset condition is not detected out.

Preferably, the step of determining whether the candidate characteristic sequence is a valid characteristic sequence includes:

determining the candidate characteristic sequence as the valid characteristic sequence when a frequency of detecting out the same candidate characteristic sequence is greater than a preset frequency threshold within a preset detection period.

Preferably, the step of detecting whether there is an associated event based on a preset rule according to the detected valid characteristic sequence includes:

determining that the associated event is detected out when the number of different valid characteristic sequences is greater than a preset number threshold or when a percentage of the number of the different valid characteristic sequences to the number of times of detection is greater than a preset ratio threshold.

Preferably, the original characteristic sequence is a special characteristic sequence periodically transmitted by the transmitting end base station on a full bandwidth of a downlink pilot time slot (DwPTS) of Subframe 1 or Subframe 6. The receiving end base station continuously detects the special characteristic sequence on two symbols of an uplink pilot time slot (UpPTS) of the Subframe 1 and 14 symbols of Subframe 2 or two symbols of UpPTS of Subframe 6 and 14 symbols of Subframe 7.

Preferably, the original characteristic sequence further includes:

a Zadoff-Chu sequence in a physical random access channel (PRACH) in a Long Term Evolution (LTE) system; and/or an m sequence in CODE DIVISION MULTIPLE ACCESS (CDMA); and/or a gold sequence in a Time Division Long Term Evolution (TD-LTE) system.

To solve the above problems, an embodiment of the present disclosure discloses an apparatus for detecting a characteristic sequence in a wireless communication system, which includes:

a receiving module, configured to receive an original characteristic sequence periodically transmitted by a transmitting end base station;

a candidate characteristic sequence detection module, configured to detect out a candidate characteristic sequence meeting a preset condition from the original characteristic sequence;

a determining module, configured to determine whether the candidate characteristic sequence is a valid characteristic sequence; and an event detection module, configured to detect whether there is an associated event based on a preset rule according to the detected valid characteristic sequence.

The preset condition includes: a maximum value of a correlation value sequence corresponding to the original characteristic sequence being greater than a preset detection threshold.

Preferably, the candidate characteristic sequence detection module includes:

a correlation calculation submodule, configured to perform a correlation calculation on the original characteristic sequence and a preset local reference characteristic sequence to obtain the correlation value sequence;

a correlation value extraction submodule, configured to extract a maximum correlation value from the correlation value sequence; and a peak value determination submodule, configured to determine whether the maximum correlation value is greater than the preset detection threshold; and call a first result submodule if the determination result is yes; or call a second result submodule if the determination result is no;

the first result submodule, configured to determine that the candidate characteristic sequence meeting the preset condition is detected out; and the second result submodule, configured to determine that the candidate characteristic sequence meeting the preset condition is not detected out.

Preferably, the determining module includes:

a frequency detection submodule, configured to detect a frequency of appearance of the same candidate characteristic sequence within a preset detection period;

a frequency determining submodule, configured to determine whether the frequency is greater than a preset frequency threshold; and call a third result submodule if the determination result is yes; and the third result submodule, configured to determine the candidate characteristic sequence as the valid characteristic sequence.

Preferably, the event detection module includes:

a number detection submodule, configured to detect the number of different valid characteristic sequences within the preset detection period;

a number determining submodule, configured to determine whether the number is greater than a preset number threshold; and call a fourth result submodule if the determination result is yes; and the fourth result submodule, configured to determine whether there is an associated event.

Preferably, the event detection module includes:

a number detection submodule, configured to detect the number of different valid characteristic sequences within the preset detection period;

a ratio determining submodule, configured to determine whether a percentage of the number of the different valid characteristic sequences to the number of times of detection is greater than a preset ratio threshold; and call a fourth result submodule if the determination result is yes; and the fourth result submodule, configured to determine whether there is an associated event.

To solve the above problems, an embodiment of the present disclosure discloses a computer program, which includes a computer-readable code. When the computer-readable code is operated on an electronic apparatus, the electronic apparatus is caused to execute the above method.

To solve the above problems, an embodiment of the present disclosure discloses a computer-readable medium, in which the foregoing computer program is stored.

Compared with the background art, the embodiments of the present disclosure include following advantages.

According to the embodiments of the present disclosure, after receiving an original characteristic sequence periodically transmitted by the transmitting end base station, the receiving end base station detects out a candidate characteristic sequence meeting a preset condition from the original characteristic sequence, and then determines whether the candidate characteristic sequence is a valid characteristic sequence, and detects whether the valid characteristic sequence has an associated event based on a preset rule. According to the embodiments of the present disclosure, the characteristic sequence meeting the preset condition is not directly determined as the valid characteristic sequence, but is marked as a candidate characteristic sequence. The candidate characteristic sequence is finally determined as the valid characteristic sequence based on a determination. In this way, it is guaranteed that the number of characteristic sequences falsely detected is reduced without increasing the missed-detection probability when the number of detections is larger.

According to a more preferred embodiment of the present disclosure, a frequency threshold is preset for a frequency of detecting out the same candidate characteristic sequence within a preset detection period, and only when the frequency of detecting out the same candidate characteristic sequence is greater than the preset frequency threshold can it be regarded that the characteristic sequence is really detected, such that in the detection process, it is guaranteed that the probability of repeatedly misdetecting the same characteristic sequence by the receiving end is lower in the case that the transmitting end does not transmit a characteristic sequence. Therefore, the probability of falsely detecting the characteristic sequence can be dramatically reduced, and thus the detection accuracy of distant interference is improved.

DESCRIPTION OF THE EMBODIMENTS

To make the foregoing objectives, features, and advantages of the present disclosure more apparent and lucid, the following further describes in detail the present disclosure with reference to the accompanying drawings and embodiments.

Figure 1:
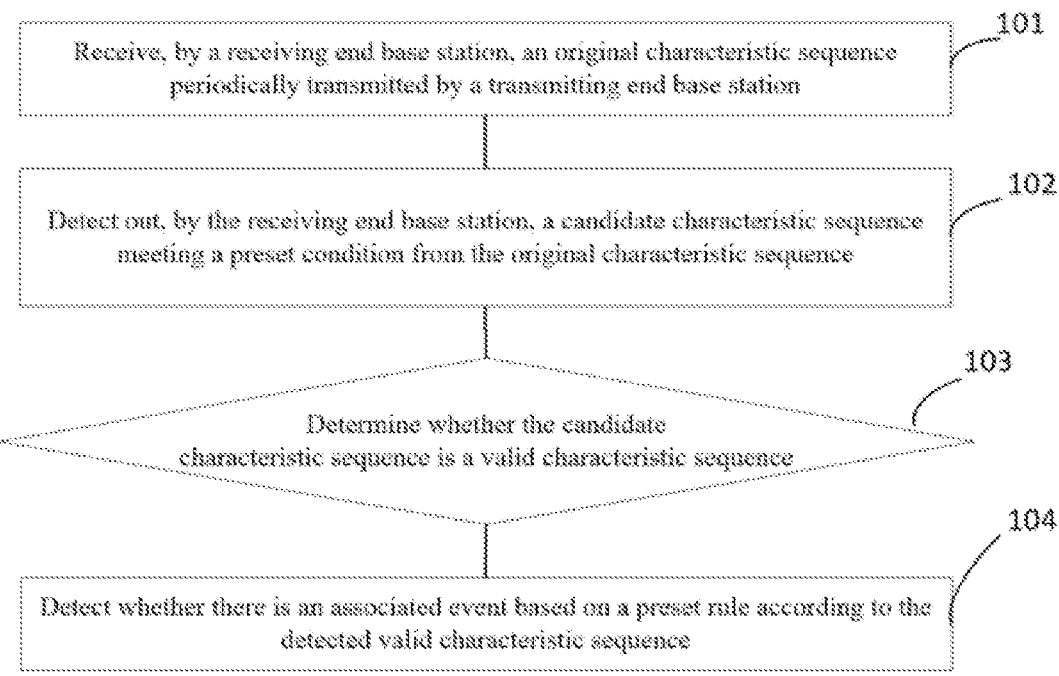
FIG. 1 is a flowchart of steps of a method for detecting a characteristic sequence in a wireless communication system according to an embodiment of the present disclosure.

Referring to FIG. 1, a flowchart of steps of a method for detecting a characteristic sequence in a wireless communication system according to an embodiment of the present disclosure is illustrated, which specifically may include following steps:

Step 101: receiving, by a receiving end base station, an original characteristic sequence periodically transmitted by a transmitting end base station.

In the embodiments of the present disclosure, the characteristic sequence refers to a pseudorandom sequence for identifying a target object, for example, a Zadoff-Chu sequence of PRACH in an LTE system, and a dedicated gold sequence customized for detecting a distant interference source in a TD-LTE system. The characteristic sequence may be the Zadoff-Chu sequence, the gold sequence or an m sequence. The transmitting end base station transmits a characteristic sequence for identifying the target object, and the receiving end base station detects out the characteristic sequence by using a correlation detection algorithm to recognize the target object. The "original characteristic sequence", the "candidate characteristic sequence" and the "valid characteristic sequence" referred to in the embodiments of the present disclosure belong to the conceptual category of a characteristic sequence.

In specific implementation, the transmitting end base station may periodically transmit a special characteristic sequence on a full bandwidth of a downlink pilot time slot (DwPTS) of Subframe 1 or Subframe 6. Correspondingly, the receiving end base station may continuously detect the special characteristic sequence on two symbols of an uplink pilot time slot (UpPTS) of the Subframe 1 and 14 symbols of Subframe 2 or two symbols of UpPTS of Subframe 6 and 14 symbols of Subframe 7.

Step 102: detecting out, by the receiving end base station, a candidate characteristic sequence meeting a preset condition from the original characteristic sequence.

The preset condition includes: a maximum value of a correlation value sequence corresponding to the original characteristic sequence being greater than a preset detection threshold.

In a preferred embodiment of the present disclosure, the candidate characteristic sequence meeting the preset condition may be detected out from the original characteristic sequence by:

performing a correlation calculation on the original characteristic sequence and a preset local reference characteristic sequence by the receiving end base station to obtain the correlation value sequence;

extracting a maximum correlation value from the correlation value sequence; and determining that the candidate characteristic sequence meeting the preset condition is detected out when the maximum correlation value is greater than the preset detection threshold; otherwise, determining that the candidate characteristic sequence meeting the preset condition is not detected out.

For example, after the receiving end base station receives the original characteristic sequence, a conjugate multiplication is performed on the original characteristic sequence and the reference characteristic sequence to obtain a correlation value sequence. After the correlation value sequence is obtained, a maximum correlation value is extracted from the correlation value sequence, and the maximum correlation value is detected. If the maximum correlation value of the correlation value sequence is greater than the preset detection threshold, the characteristic sequence may be marked as a candidate characteristic sequence meeting the preset condition. However, if the maximum correlation value of the correlation value sequence is less than or equal to the preset detection threshold, the characteristic sequence may be marked as a candidate characteristic sequence not meeting the preset condition.

Step 103: determining whether the candidate characteristic sequence is a valid characteristic sequence.

It may be understood that in the embodiments of the present disclosure, the valid characteristic sequence refers to a more reliable characteristic sequence having a smaller false-detection (erroneous detection) probability.

As a preferred embodiment of the present disclosure, the candidate characteristic sequence may be detected within preset detection period, and the candidate characteristic sequence is determined as the valid characteristic sequence when a frequency of detecting out the same candidate characteristic sequence is greater than a preset frequency threshold within the preset detection period.

For example, supposing the detection period is 5 minutes and the preset detection frequency threshold is 3, the number of times of detection of a characteristic sequence whose ID=2 is 5 within the detection period. In this case, the characteristic sequence whose ID=2 is determined as the detected valid characteristic sequence.

Of course, those skilled in the art also may use the method provided by the embodiments of the present disclosure to obtain the valid characteristic sequence by performing different settings on the detection period and the frequency threshold according to actual needs, but the present disclosure is not limited thereto.

Step 104: detecting whether there is an associated event based on a preset rule according to the detected valid characteristic sequence.

As a preferred embodiment of the present disclosure, the number of different valid characteristic sequences may be detected within a preset detection period, and it is determined that the associated event is detected out when the number of different valid characteristic sequences is greater than a preset number threshold.

For example, supposing the detection period is 5 minutes, the detection frequency threshold is 3 and the preset characteristic sequence number threshold is 5, 10 characteristic sequences are detected within the detection period, wherein the frequency of detecting out 8 characteristic sequences is more than 3, the frequency of detecting out 2 characteristic sequences is less than or equal to 3, in this case, the number of detected valid characteristic sequences is 8. When the detection result is greater than the preset characteristic sequence number threshold, this detection may be marked as having an associated event, and the associated event may be a distant interference.

As another preferred embodiment of the present disclosure, the number of the different valid characteristic sequences may be detected within the preset detection period, and it is determined that the associated event is detected out when a percentage of the number of the different valid characteristic sequences to the number of times of detection is greater than a preset ratio threshold.

For example, supposing the detection period is 5 minutes, a preset characteristic probability threshold is 5%, characteristic signals transmitted by the transmitting end are detected for 100 times within the detection period. When 10 characteristic sequences are detected, wherein the frequency of detecting out 8 characteristic sequences is more than 3, and the frequency of detecting out 2 characteristic sequences is less than or equal to 3, in this case, the number of detected valid characteristic sequences is 8, and the percentage of the number of the different types of valid characteristic sequences to the number of times of detection is 8%. When the detection result is greater than the preset characteristic probability threshold, this detection may be marked as having an associated event, and the associated event may be a distant interference.

Of course, it is feasible for those skilled in the art to arbitrarily select one or more of the above methods to detect whether the valid characteristic sequence has the associated event according to actual circumstances, which is not limited by the present disclosure.

In the description of the above solution, only when the frequency of detecting out the same characteristic sequence exceeds the preset threshold may it be considered that the characteristic sequence is really detected. The probability of repeatedly misdetecting the same characteristic sequence by the receiving end is lower in the case that the transmitting end does not transmit a characteristic sequence. Therefore, according to this technical solution, the false-detection probability of detecting the characteristic sequence can be dramatically reduced.

To make those skilled in the art better understand the present disclosure, the embodiments of the present disclosure are further described below by way of a specific example.

1. After it is determined that the associated event is a suspected distant interference according to an interference power and an interference characteristic of an uplink subframe, the interfered base station (i.e., the transmitting end base station) periodically transmits a special characteristic sequence on the full bandwidth of DwPTS of Subframe 1 or Subframe 6, and the original characteristic sequence is selected from a gold sequence or a ZC sequence.

2. The receiving end base station continuously detects the characteristic sequence on two symbols of UpPTS of the Subframe 1 and 14 symbols of Subframe 2 or two symbols of UpPTS of Subframe 6 and 14 symbols of Subframe 7.

3. The receiving end base station transforms a received time domain uplink signal into a frequency domain by way of FFT (Fast Fourier Transformation) processing, and performs a correlation calculation on the frequency domain and a preset local reference characteristic sequence, and then transforms the frequency domain-related data subjected to the correlation calculation into a time domain by way of IFFT (Inverse Fast Fourier Transform). If a ratio of a correlation power value of the maximum correlation peak of the time domain to an average noise power is greater than the preset detection threshold, it is determined that the characteristic sequence is detected in this detection.

4. The characteristic sequence is determined as the valid characteristic sequence when a frequency of detecting out the same candidate characteristic sequence is greater than a frequency threshold within the preset detection period. It is determined that the associated event of the valid characteristic sequence is detected out when the number of different valid characteristic sequences is greater than a number threshold or when a percentage of the number of the different valid characteristic sequences to the number of times of detection is greater than a ratio threshold within the preset detection period.

5. To evaluate the characteristic sequence detection performance of this technical solution, a link simulation is performed on the false-detection probability and the missed-detection probability in an AWGN (Additive White Gaussian Noise) channel environment, and simulation results are as follows.

Figure 2:
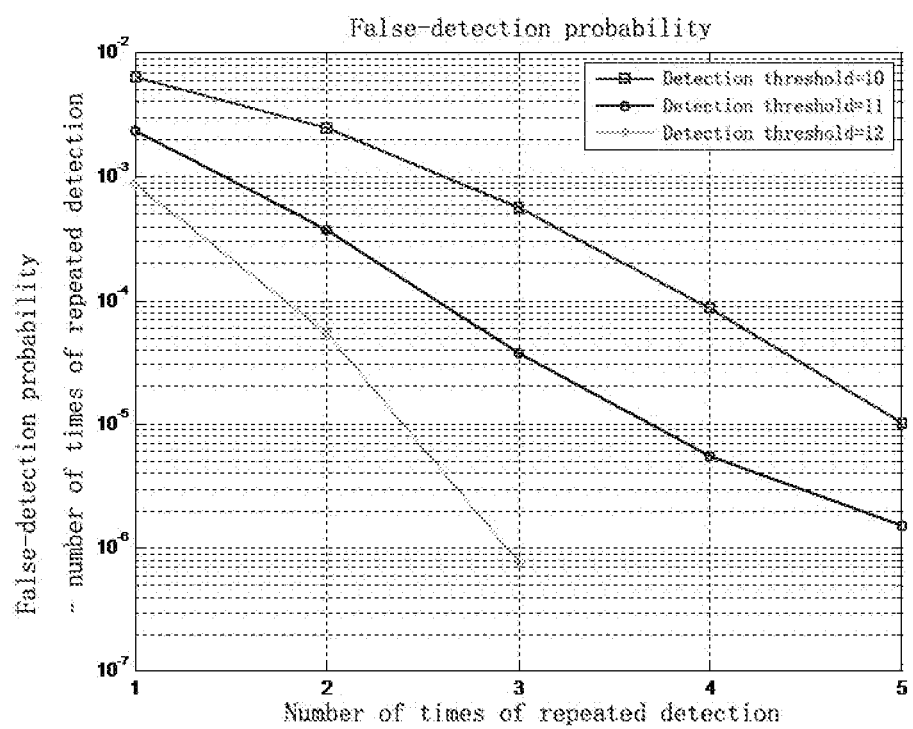
FIG. 2 is a schematic diagram of a false-detection probability simulation result according to an embodiment of the present disclosure.

Referring to FIG. 2, a schematic diagram of a false-detection probability simulation result according to an embodiment of the present disclosure is illustrated. The false-detection probability may be significantly decreased by detecting a sequence signal from a transmitting end using the method according to this embodiment of the present disclosure.

Figure 3:
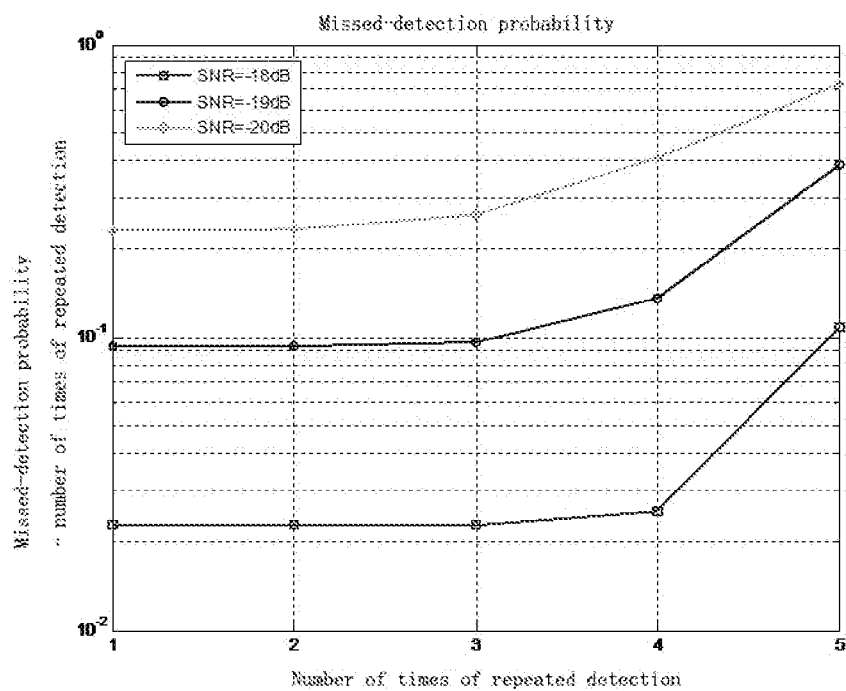
FIG. 3 is a schematic diagram of a missed-detection probability simulation result according to an embodiment of the present disclosure.

Referring to FIG. 3, a schematic diagram of a missed-detection probability simulation result according to an embodiment of the present disclosure is illustrated. The missed-detection probability may be significantly decreased by detecting a sequence signal from a transmitting end using the method according to this embodiment of the present disclosure.

According to the embodiments of the present disclosure, after receiving an original characteristic sequence periodically transmitted by the transmitting end base station, the receiving end base station detects out a candidate characteristic sequence meeting a preset condition from the original characteristic sequence, and then determines whether the candidate characteristic sequence is a valid characteristic sequence, and detects whether the detected valid characteristic sequence has an associated event based on a preset rule. According to the embodiments of the present disclosure, the characteristic sequence meeting the preset condition is not directly determined as the valid characteristic sequence, but is marked as a candidate characteristic sequence. The candidate characteristic sequence is finally determined as the valid characteristic sequence based on a determination. In this way, it is guaranteed that the number of characteristic sequences falsely detected is reduced without increasing the missed-detection probability when the number of detections is larger.

According to a more preferred embodiment of the present disclosure, a frequency threshold is preset for a frequency of detecting out the same candidate characteristic sequence within a preset detection period, and only when the frequency of detecting out the same candidate characteristic sequence is greater than the preset frequency threshold can it be regarded that the characteristic sequence is really detected, such that in the detection process, it is guaranteed that the probability of repeatedly misdetecting the same characteristic sequence by the receiving end is lower in the case that the transmitting end does not transmit a characteristic sequence. Therefore, the probability of falsely detecting the characteristic sequence can be dramatically reduced, and thus the detection accuracy of distant interference is improved.

It is to be noted that, for a brief description, method embodiments are describe as a combination of a series of motions. However, those skilled in the art should know that the embodiments of the present disclosure are not limited by sequences of the motions described. This is because some steps may be performed by using other sequences or be performed simultaneously in accordance with the embodiments of the present disclosure. In addition, those skilled in the art should also learn that the embodiments described in the specification are preferred embodiments, and involved motions are not necessary for the embodiments of the present disclosure.

Figure 4:
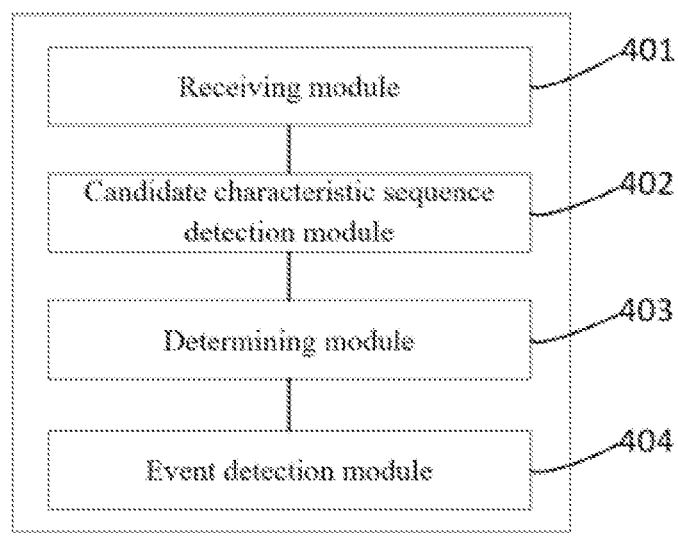
FIG. 4 is a structural block diagram of an apparatus for detecting a characteristic sequence in a wireless communication system according to an embodiment of the present disclosure.

Referring to FIG. 4, a structural block diagram of an apparatus for detecting a characteristic sequence in a wireless communication system according to an embodiment of the present disclosure is illustrated. The apparatus is positioned at a receiving end base station, and specifically may include following modules:

a receiving module 401, configured to receive an original characteristic sequence periodically transmitted by a transmitting end base station;

a candidate characteristic sequence detection module 402, configured to detect out a candidate characteristic sequence meeting a preset condition from the original characteristic sequence;

a determining module 403, configured to determine whether the candidate characteristic sequence is a valid characteristic sequence; and an event detection module 404, configured to detect whether there is an associated event based on a preset rule according to the detected valid characteristic sequence.

The preset condition includes: a maximum value of a correlation value sequence corresponding to the original characteristic sequence being greater than a preset detection threshold.

In one preferred embodiment of the embodiments of the present disclosure, the candidate characteristic sequence detection module 402 may include following submodules:

a correlation calculation submodule, configured to perform a correlation calculation on the original characteristic sequence and a preset local reference characteristic sequence to obtain the correlation value sequence;

a correlation value extraction submodule, configured to extract a maximum correlation value from the correlation value sequence; and a peak value determination submodule, configured to determine whether the maximum correlation value is greater than the preset detection threshold; and call a first result submodule if the determination result is yes; or call a second result submodule if the determination result is no;

the first result submodule, configured to determine that the candidate characteristic sequence meeting the preset condition is detected out; and the second result submodule, configured to determine that the candidate characteristic sequence meeting the preset condition is not detected out.

In one preferred embodiment of the embodiments of the present disclosure, the determining module 403 may include following submodules:

a frequency detection submodule, configured to detect a frequency of appearance of the same candidate characteristic sequence within a preset detection period;

a frequency determining submodule, configured to determine whether the frequency is greater than a preset frequency threshold; and call a third result submodule if the determination result is yes; and the third result submodule, configured to determine the candidate characteristic sequence as the valid characteristic sequence.

In one preferred embodiment of the embodiments of the present disclosure, the event detection module 404 may include following submodules:

a number detection submodule, configured to detect the number of different valid characteristic sequences within the preset detection period;

a number determining submodule, configured to determine whether the number is greater than a preset number threshold; and call a fourth result submodule if the determination result is yes; and the fourth result submodule, configured to determine whether there is an associated event.

In another preferred embodiment of the embodiments of the present disclosure, the event detection module 404 may further include following submodules:

a number detection submodule, configured to detect the number of different valid characteristic sequences within the preset detection period;

a ratio determining submodule, configured to determine whether a percentage of the number of the different valid characteristic sequences to the number of times of detection is greater than a preset ratio threshold; and call a fourth result submodule if the determination result is yes; and the fourth result submodule, configured to determine whether there is an associated event.

According to the embodiments of the present disclosure, after receiving an original characteristic sequence periodically transmitted by the transmitting end base station, the receiving end base station detects out a candidate characteristic sequence meeting a preset condition from the original characteristic sequence, and then determines whether the candidate characteristic sequence is a valid characteristic sequence, and detects whether the detected valid characteristic sequence has an associated event based on a preset rule. According to the embodiments of the present disclosure, the characteristic sequence meeting the preset condition is not directly determined as the valid characteristic sequence, but is marked as a candidate characteristic sequence. The candidate characteristic sequence is finally determined as the valid characteristic sequence based on a determination. In this way, it is guaranteed that the number of characteristic sequences falsely detected is reduced without increasing the missed-detection probability when the number of detections is larger.

According to a more preferred embodiment of the present disclosure, a frequency threshold is preset for a frequency of detecting out the same candidate characteristic sequence within a preset detection period, and only when the frequency of detecting out the same candidate characteristic sequence is greater than the preset frequency threshold can it be regarded that the characteristic sequence is really detected, such that in the detection process, it is guaranteed that the probability of repeatedly misdetecting the same characteristic sequence by the receiving end is lower in the case that the transmitting end does not transmit a characteristic sequence. Therefore, the probability of falsely detecting the characteristic sequence can be dramatically reduced, and thus the detection accuracy of distant interference is improved.

System embodiments are basically similar to method embodiments, thus description of the system embodiments is relatively simple, and reference can be made to the description of the method embodiments for relevant parts.

The embodiments in the specification are described in a progressive manner. Each embodiment is focused on difference from other embodiments. And cross reference is available for identical or similar parts among different embodiments.

Those skilled in the art should realize that the embodiments of the present disclosure may be provided as a method, a system or a computer program product. Therefore, the embodiments of the present disclosure may use forms of a full hardware embodiment, a full software embodiment, or an embodiment in combination of software and hardware aspects. Furthermore, the embodiments of the present disclosure may use forms of computer program products implemented on one or more computer storage media (including but not limited to a magnetic disk memory, a CD-ROM, an optical memory or the like) which includes a computer program code.

The embodiments of the present disclosure are described with reference to flowcharts and/or block diagrams according to the method, terminal equipment (system) and computer program product of the embodiments of the present disclosure. It is to be understood that each flow and/or block in the flowchart and/or block diagram as well as combination of flow and/or block in the flowchart and/or block diagram may be realized by computer program instructions. These computer program instructions may be provided to a general purpose computer, a special purpose computer, an embedded processor or processors of other programmable data processing equipment so as to generate a machine so that such a system configured to achieve functions designated in one or more flows of the flowchart and/or in one or more blocks of the block diagram is generated by means of instructions executed by computers or processors of other programmable data processing equipment.

These computer program instructions may also be stored in a computer-readable memory which can lead a computer or other programmable data processing equipment to work in a particular way so that instructions stored in the computer-readable memory may generate a manufactured product comprising a command system which can achieve functions designated in one or more flows of the flowchart and/or in one or more blocks of the block diagram.

These computer program instructions may also be loaded on a computer or other programmable data processing terminal equipment, to execute a series of operating steps on the computer or other programmable terminal equipment to generate treatments implemented by the computer, so that instructions executed on the computer or other programmable terminal equipment provide steps configured to implement designated functions in one or more flows of a flowchart and/or one or more blocks of a block diagram.

Each of devices according to the embodiments of the present disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the parts in the server according to the embodiments of the present disclosure. The present disclosure may further be implemented as equipment or device program (for example, computer program and computer program product) for executing some or all of the methods as described herein. Such program for implementing the present disclosure may be stored in the computer readable medium, or have a form of one or more signals. Such a signal may be downloaded from the Internet websites, or be provided on a carrier signal, or provided in any other form.

Figure 5:
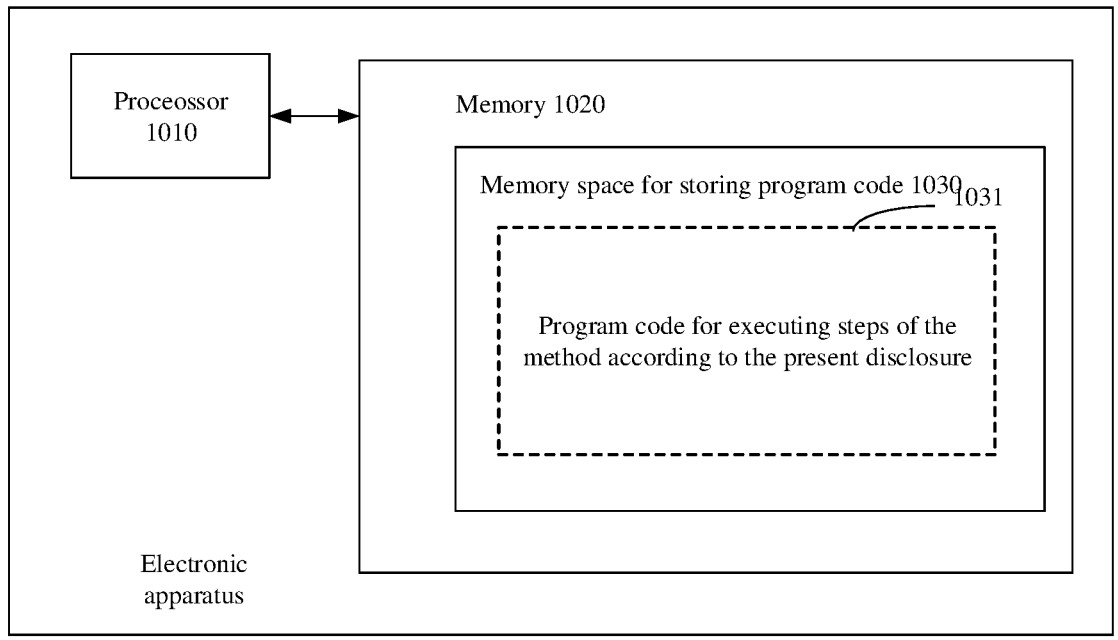
FIG. 5 schematically illustrates a block diagram of an electronic apparatus for performing the method according to the present disclosure.
Figure 6:
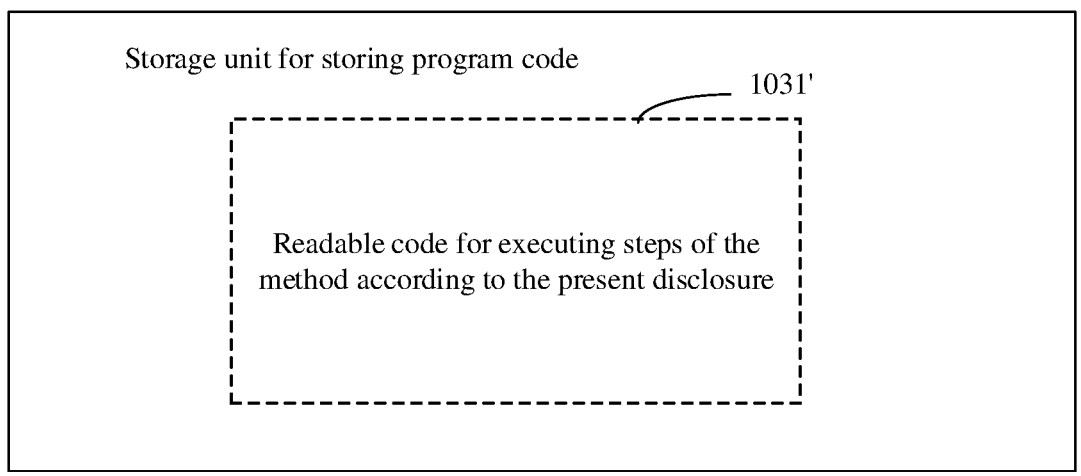
FIG. 6 schematically illustrates a memory cell for maintaining or carrying a program code for implementing the method according to the present disclosure.

For example, FIG. 5 illustrates an electronic apparatus, such as a server, that may perform the method for processing service data according to the present disclosure. Traditionally, the electronic apparatus includes a processor 1010 and a computer program product or a computer readable medium in form of a memory 1020. The memory 1020 may be an electronic memory such as a flash memory, EEPROM (Electrically Erasable Programmable Read-Only Memory), EPROM, a hard disk or ROM. The memory 1020 has a memory space 1030 for executing program codes 1031 of any steps in the above methods. For example, the memory space 1030 for program codes may comprise respective program codes 1031 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 6. The memory cells may be provided with memory sections, memory spaces, etc., similar to the memory 1020 of the electronic apparatus as shown in FIG. 5. The program codes may be compressed for example in an appropriate form. Usually, the memory cell includes computer readable codes 1031' which can be read for example by processors 1010. When these codes are operated on the electronic apparatus, the electronic apparatus may be caused to execute respective steps in the method as described above.

Although preferred embodiments of the embodiments of the present disclosure have been described, those skilled in the art may make additional alterations and modifications on these embodiments as soon as they know the basic creative concept. Therefore, the appended claims are intended to be interpreted as comprising preferred embodiments and all alterations and modifications falling within the scope of the embodiments of the present disclosure.

Finally it should be explained that a relational term (such as a first or a second . . . ) is merely intended to separate one entity or operation from another entity or operation instead of requiring or hinting any practical relation or sequence exists among these entities or operations. Furthermore, terms such as "comprise", "include" or other variants thereof are intended to cover a non-exclusive "comprise" so that a process, a method, a merchandise or a terminal device comprising a series of elements not only includes these elements, but also includes other elements not listed explicitly, or also includes inherent elements of the process, the method, the merchandise or the terminal device. In the case of no more restrictions, elements restricted by a sentence "include a . . . " do not exclude the fact that additional identical elements may exist in a process, a method, a merchandise or a terminal device of these elements.

A method for detecting a characteristic sequence in a wireless communication system and an apparatus for detecting a characteristic sequence in a wireless communication system provided by the present disclosure are described above in detail. In this paper, the specific examples are used to describe the principle and the implementation of the present disclosure. The description of the foregoing embodiments is merely intended to assist in understanding the method of the present disclosure and the core concept thereof; also, those of ordinary skill in the art may change, in accordance with the concept of the present disclosure, a concrete implementation and a scope of application. In conclusion, contents of the specification shall be not interpreted as limiting the present disclosure.

What is claimed is:

1. A method for detecting a characteristic sequence in a wireless communication system, comprising:
    receiving, by a receiving end base station, an original characteristic sequence periodically transmitted by a transmitting end base station;
    detecting out, by the receiving end base station, a candidate characteristic sequence meeting a preset condition from the original characteristic sequence;
    determining whether the candidate characteristic sequence is a valid characteristic sequence; and
    detecting whether there is an associated event based on a preset rule according to the detected valid characteristic sequence;
    wherein the preset condition comprises: a maximum value of a correlation value sequence corresponding to the original characteristic sequence being greater than a preset detection threshold.

2. The method according to claim 1, wherein the step of detecting out, by the receiving end base station, a candidate characteristic sequence meeting a preset condition from the original characteristic sequence comprises:
    performing a correlation calculation on the original characteristic sequence and a preset local reference characteristic sequence by the receiving end base station to obtain the correlation value sequence;
    extracting a maximum correlation value from the correlation value sequence; and
    determining that the candidate characteristic sequence meeting the preset condition is detected out when the maximum correlation value is greater than the preset detection threshold;
    otherwise, determining that the candidate characteristic sequence meeting the preset condition is not detected out.

3. The method according to claim 1, wherein the step of determining whether the candidate characteristic sequence is a valid characteristic sequence comprises:
    determining the candidate characteristic sequence as the valid characteristic sequence when a frequency of detecting out the same candidate characteristic sequence is greater than a preset frequency threshold within a preset detection period.

4. The method according to claim 3, wherein the step of detecting whether there is an associated event based on a preset rule according to the detected valid characteristic sequence comprises:
    determining that the associated event is detected out when the number of different valid characteristic sequences is greater than a preset number threshold or when a percentage of the number of the different valid characteristic sequences to the number of times of detection is greater than a preset ratio threshold.

5. The method according to claim 1, wherein the original characteristic sequence is a special characteristic sequence periodically transmitted by the transmitting end base station on a full bandwidth of a downlink pilot time slot (DwPTS) of Subframe 1 or Subframe 6; and wherein the receiving end base station continuously detects the special characteristic sequence on two symbols of an uplink pilot time slot (UpPTS) of the Subframe 1 and 14 symbols of Subframe 2 or two symbols of UpPTS of Subframe 6 and 14 symbols of Subframe 7.

6. The method according to claim 1, wherein the original characteristic sequence further comprises one or more of:
    a Zadoff-Chu sequence in a physical random access channel (PRACH) in a Long Term Evolution (LTE) system;
    an m sequence in code division multiple access (CDMA); and
    a gold sequence in a Time Division Long Term Evolution (TD-LTE) system.

7. An electronic apparatus for detecting a characteristic sequence in a wireless communication system, wherein the apparatus is positioned at a receiving end base station and the electronic apparatus comprises:
    a memory having instructions stored thereon;

a processor configured to execute the instructions to perform operations comprising:
receiving an original characteristic sequence periodically transmitted by a transmitting end base station;
detecting out a candidate characteristic sequence meeting a preset condition from the original characteristic sequence;
determining whether the candidate characteristic sequence is a valid characteristic sequence; and
detecting whether there is an associated event based on a preset rule according to the detected valid characteristic sequence;
wherein the preset condition comprises: a maximum value of a correlation value sequence corresponding to the original characteristic sequence being greater than a preset detection threshold.

8. The electronic apparatus according to claim 7, wherein the operation of detecting out a candidate characteristic sequence meeting a preset condition from the original characteristic sequence comprises:
performing a correlation calculation on the original characteristic sequence and a preset local reference characteristic sequence to obtain the correlation value sequence;
extracting a maximum correlation value from the correlation value sequence; and
determining that the candidate characteristic sequence meeting the preset condition is detected out when the maximum correlation value is greater than the preset detection threshold;
otherwise, determining that the candidate characteristic sequence meeting the preset condition is not detected out.

9. The electronic apparatus according to claim 7, wherein the operation of determining whether the candidate characteristic sequence is a valid characteristic sequence comprises:
determining the candidate characteristic sequence as the valid characteristic sequence when a frequency of detecting out the same candidate characteristic sequence is greater than a preset frequency threshold within a preset detection period.

10. The electronic apparatus according to claim 9, wherein the operation of detecting whether there is an associated event based on a preset rule according to the detected valid characteristic sequence comprises:
determining that the associated event is detected out when the number of different valid characteristic sequences is greater than a preset number threshold or when a percentage of the number of the different valid characteristic sequences to the number of times of detection is greater than a preset ratio threshold.

11. A non-transitory computer-readable medium having computer programs stored thereon that, when executed by one or more processors of an electronic apparatus, cause the electronic apparatus to perform operations for detecting a characteristic sequence in a wireless communication system, wherein the electronic apparatus is positioned at a receiving end base station and the operations comprising:
receiving, by a receiving end base station, an original characteristic sequence periodically transmitted by a transmitting end base station;
detecting out, by the receiving end base station, a candidate characteristic sequence meeting a preset condition from the original characteristic sequence;
determining whether the candidate characteristic sequence is a valid characteristic sequence; and
detecting whether there is an associated event based on a preset rule according to the detected valid characteristic sequence;
wherein the preset condition comprises: a maximum value of a correlation value sequence corresponding to the original characteristic sequence being greater than a preset detection threshold.

12. The non-transitory computer-readable medium according to claim 11, wherein the operation of detecting out, by the receiving end base station, a candidate characteristic sequence meeting a preset condition from the original characteristic sequence comprises:
performing a correlation calculation on the original characteristic sequence and a preset local reference characteristic sequence by the receiving end base station to obtain the correlation value sequence;
extracting a maximum correlation value from the correlation value sequence; and
determining that the candidate characteristic sequence meeting the preset condition is detected out when the maximum correlation value is greater than the preset detection threshold;
otherwise, determining that the candidate characteristic sequence meeting the preset condition is not detected out.

13. The non-transitory computer-readable medium according to claim 11, wherein the operation of determining whether the candidate characteristic sequence is a valid characteristic sequence comprises:
determining the candidate characteristic sequence as the valid characteristic sequence when a frequency of detecting out the same candidate characteristic sequence is greater than a preset frequency threshold within a preset detection period.

14. The non-transitory computer-readable medium according to claim 13, wherein the operation of detecting whether there is an associated event based on a preset rule according to the detected valid characteristic sequence comprises:
determining that the associated event is detected out when the number of different valid characteristic sequences is greater than a preset number threshold or when a percentage of the number of the different valid characteristic sequences to the number of times of detection is greater than a preset ratio threshold.

15. The non-transitory computer-readable medium according to claim 11, wherein the original characteristic sequence is a special characteristic sequence periodically transmitted by the transmitting end base station on a full bandwidth of a downlink pilot time slot (DwPTS) of Subframe 1 or Subframe 6; and wherein the receiving end base station continuously detects the special characteristic sequence on two symbols of an uplink pilot time slot (UpPTS) of the Subframe 1 and 14 symbols of Subframe 2 or two symbols of UpPTS of Subframe 6 and 14 symbols of Subframe 7.

16. The non-transitory computer-readable medium according to claim 11, wherein the original characteristic sequence further comprises one or more of:
a Zadoff-Chu sequence in a physical random access channel (PRACH) in a Long Term Evolution (LTE) system;
an m sequence in code division multiple access (CDMA); and a gold sequence in a Time Division Long Term Evolution (TD-LTE) system.

* * * * *